(12) United States Patent
Niot et al.

(10) Patent No.: US 11,137,176 B2
(45) Date of Patent: Oct. 5, 2021

(54) OPTICAL REFRIGERATOR AND SENSOR INCLUDING SUCH A REFRIGERATOR

(71) Applicant: L'Air Liquide, Societe Anonyme pour l'Etude et l'Exploitation des Procedes Georges Claude, Paris (FR)

(72) Inventors: Jean-Michel Niot, Sassenage (FR); Arnaud Gardelein, Fontaine (FR)

(73) Assignee: L'Air Liquide Société Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 0 days.

(21) Appl. No.: 16/498,692

(22) PCT Filed: Mar. 15, 2018

(86) PCT No.: PCT/FR2018/050622
§ 371 (c)(1),
(2) Date: Sep. 27, 2019

(87) PCT Pub. No.: WO2018/178537
PCT Pub. Date: Oct. 4, 2018

(65) Prior Publication Data
US 2021/0102735 A1    Apr. 8, 2021

(30) Foreign Application Priority Data

Mar. 29, 2017  (FR) ...................................... 1752628

(51) Int. Cl.
*F25B 23/00* (2006.01)
*G01J 1/02* (2006.01)

(52) U.S. Cl.
CPC ............ *F25B 23/00* (2013.01); *G01J 1/0252* (2013.01)

(58) Field of Classification Search
CPC ......... F25B 23/00; G01J 1/0252; G01J 5/061; G01N 21/49; H01S 3/1062; H01S 5/02365; H01J 37/244
See application file for complete search history.

(56) References Cited

U.S. PATENT DOCUMENTS

| | | | | |
|---|---|---|---|---|
| 5,615,558 A | * | 4/1997 | Cornell | ................. F25B 23/003 62/264 |
| 6,041,610 A | * | 3/2000 | Edwards | ................. F25B 23/00 62/264 |

(Continued)

FOREIGN PATENT DOCUMENTS

CN    204 927 789    12/2015

OTHER PUBLICATIONS

International Search Report and Written Report for PCT/FR2018/050622, dated Jun. 25, 2018.

(Continued)

*Primary Examiner* — Emmanuel E Duke
(74) *Attorney, Agent, or Firm* — Christopher J. Cronin

(57) ABSTRACT

An optical refrigerator for cooling an infrared detector or sensor, that includes a laser radiation source, a cooling crystal for receiving laser radiation from the source and to be cooled, an element to be cooled, and a thermal link in heat exchange between the crystal and the element to be cooled, in order to transfer frigories from the crystal to the element to be cooled. The thermal link comprises two plates having respective first ends in heat exchange with two distinct surfaces of the crystal, respectively, the two plates having second ends in heat exchange with the element to be cooled.

12 Claims, 2 Drawing Sheets

(56) References Cited

U.S. PATENT DOCUMENTS

| | | | | |
|---|---|---|---|---|
| 8,720,219 | B1* | 5/2014 | Sheik-Bahae | H01S 3/0408 |
| | | | | 62/264 |
| 9,362,712 | B1* | 6/2016 | Sheik-Bahae | H01S 3/13 |
| 9,574,801 | B1* | 2/2017 | Seletskiy | F25B 23/00 |
| 2015/0075181 | A1* | 3/2015 | Epstein | F25B 23/003 |
| | | | | 62/3.1 |

OTHER PUBLICATIONS

French Search Report and Written Opinion for FR 1 752 628, dated Nov. 28, 2017.
M. Sheik-Bahe and R.I. Epstein "Optical Refrigeration" Nat. Photonics 1, 12, 693 (2007).

* cited by examiner

OPTICAL REFRIGERATOR AND SENSOR INCLUDING SUCH A REFRIGERATOR

CROSS-REFERENCE TO RELATED APPLICATIONS

This application is a § 371 of International PCT Application PCT/FR2018/050622, filed Mar. 15, 2018, which claims § 119(a) foreign priority to French patent application FR 1752628, filed Mar. 29, 2017.

BACKGROUND

Field of the Invention

The invention relates to an optical refrigerator and to a detector comprising a refrigerator.

The invention more particularly relates to an optical refrigerator, in particular for cooling an infrared detector or sensor, the refrigerator comprising a source of laser radiation, a cooling crystal configured to receive the laser radiation from the source and to be cooled, an element to be cooled and a thermal link in heat exchange on the one hand with the crystal and on the other hand with the element to be cooled, in order to transfer frigories from the crystal to the element to be cooled.

Related Art

For the observation of the Earth by satellite in the domain of the infrared, it is necessary to cool the infrared photodetectors or detectors to cryogenic temperatures, typically below 200 K. Current solutions are based either on the use of passive systems, or on active systems based on mechanical actuators.

One known optical cooling method is based on the anti-Stokes shift or "anti-Stokes fluorescence". Cf. for example U.S. Pat. No. 9,362,712, U.S. 60/441,610 or U.S. Pat. No. 8,720,219. This solution is based on the following physical principle: when the emission and absorption bands of a material (crystal) are superposed, excitation of the top portion of the absorption spectrum leads to the emission of photons that are more energetic than the absorbed photons. This (emission/absorption) energy difference is due to the annihilation of phonons in the crystal lattice of the material, phonons being the vibratory quanta in solids. In the solid state, thermal energy is mainly contained in the vibrational modes of the lattice. Specifically, thermal agitation causes the atoms to oscillate about their equilibrium position. Therefore, heat is extracted from the material via the anti-Stokes emission, this inducing a cooling effect. Cf. also the publication by M. Sheik-Bahe and R. I. Epstein "Optical Refrigeration" Nat. Photonics 1, 12, 693 (2007).

This refrigeration technology is potentially applicable to the cooling of sensors in the field of space technology.

In known solutions, the thermal link consists of a segment of material (sapphire in general) of J shape the end faces (terminal sections) of which make contact with the crystal and with the element to be cooled, respectively. The J or doglegged shape is provided to remove the crystal from the axis of the plane of the element to be cooled while minimizing the transmitted radiation (cf. US2015075181A1).

Known devices are however not very compatible with the constraints of certain applications, in particular space applications.

These constraints or insufficiencies of the prior art may in particular relate to all or some of:
- the mechanical attachment of the crystal to the element to be cooled,
- the conduction of the energy to be extracted from the element to be cooled to the crystal,
- the limitation of thermal losses (the thermal link must trap the minimum of anti-Stokes radiation or transfer the minimum of this radiation to the element to be cooled),
- the problem of reliability in case of breakage of an element of the device.

SUMMARY OF THE INVENTION

One aim of the present invention is to mitigate all or some of the aforementioned drawbacks of the prior art.

To this end, the refrigerator according to the invention, which is moreover according to the generic definition thereof that is given in the above preamble, is essentially characterized in that the thermal link comprises two plates having respective first ends in heat exchange with two distinct surfaces of the crystal, respectively, the two plates having second ends in heat exchange with the element to be cooled.

This refrigerator structure in particular allows better mechanical attachment of the crystal via the thermal link. This structure of the link in two parts at least (two plates) also ensures a mechanical redundancy of the function for maintaining and transferring the cold that is indispensable for the reliability of a space application.

With this architecture, the anti-Stokes radiation is less guided toward the element to be cooled and the areas of heat exchange with the crystal and the element to be cooled may be increased.

Moreover, embodiments of the invention may comprise one or more of the following features:
- the second ends of the two plates are in heat exchange with two distinct surfaces of the element to be cooled, respectively;
- the second ends of the two plates sandwich the element to be cooled, i.e. the plates are placed on either side of two opposite flanks of the element to be cooled;
- the first ends of the two plates sandwich the crystal, i.e. the plates are placed on either side of two opposite flanks of the crystal;
- the plates each have a "J" or doglegged shape, i.e. each plate extends in a plane non-rectilinearly, the ends of the plate in heat exchange with the crystal and the element to be cooled, respectively, being located at two ends located on either side of a dogleg or corner, respectively;
- the plates are made of a transparent material such as glass or sapphire;
- the device comprises at least two mirrors of high reflectivity placed around the crystal in order to concentrate the light in the crystal;
- the device comprises baffles for absorbing the light radiation generated by the crystal, the baffles being arranged around the crystal;
- the device comprises baffles for absorbing the light radiation generated by the crystal also around the faces of the crystal linked to the plates;
- the element to be cooled is a cold finger or a focal plane intended to transfer frigories to a load;
- the crystal has a parallelepipedal shape or any suitable shape;

the plates have a thickness comprised between 0.1 and 5 mm and in particular between 0.5 mm and 5 mm, and a width comprised between 0.1 and 10 mm and in particular between 1 mm and 10 mm, and a length comprised between 0.1 and 50 mm and in particular between 2 mm and 40 mm;

the plates make contact with the crystal in an area of size comprised between 1 mm$^2$ and 100 mm$^2$ and in particular 1 mm$^2$ and 75 mm$^2$;

the plates make contact with the element to be cooled in an area of size comprised between 0.1 mm$^2$ and 100 mm$^2$ and in particular between 1 mm$^2$ and 100 mm$^2$.

The invention also relates to a detector comprising a measuring unit and refrigerator of the measuring unit, the refrigerator being according to any one of the above or below features.

The invention may also relate to any alternative device or method comprising any combination of the features above or below.

BRIEF DESCRIPTION OF THE FIGURES

Other particular features and advantages will become apparent from reading the following description, given with reference to the figures, in which.

DETAILED DESCRIPTION OF THE INVENTION

Figure 1:
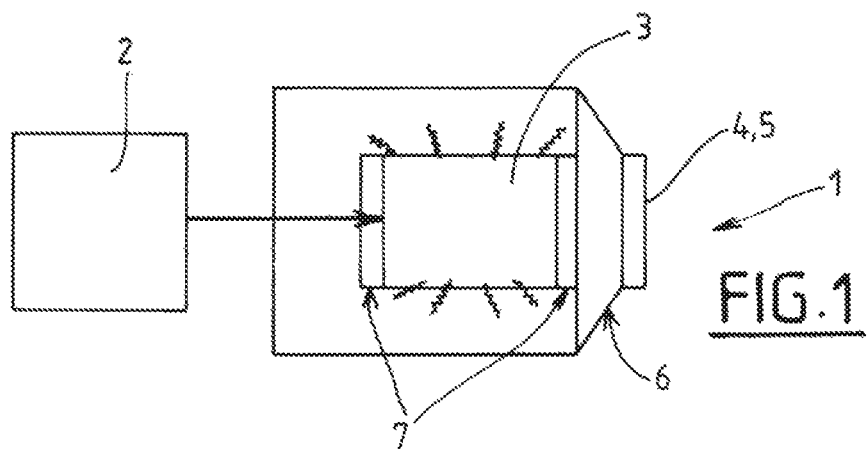
FIG. 1 shows a schematic and partial side view illustrating an example of the structure and operation of an optical refrigerator.
Figure 2:
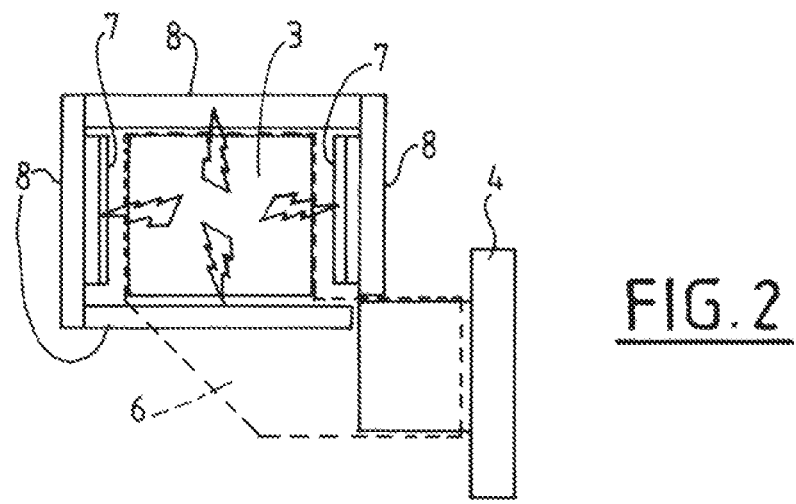
FIG. 2 shows a schematic and partial side view of a detail of an example of the optical refrigerator structure according to the invention.

FIG. 1 illustrates the structure and the operating principle of an optical refrigerator.

Figure 5:
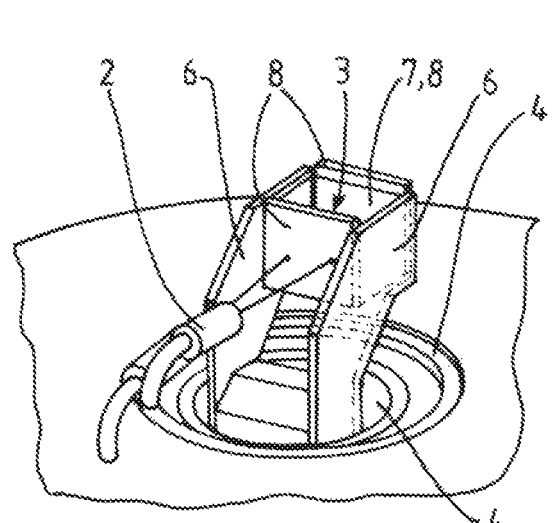
FIGS. 5 and 6 show schematic and partial perspective views of the refrigerator of FIG. 4 in two partially disassembled configurations.

Such a refrigerator 1 comprises a source 2 of laser radiation configured to emit radiation toward a cooling crystal 3 (cf. FIG. 5 also). The crystal 3 is framed between at least two reflective mirrors 7 in order to concentrate the light in the crystal 3. The assembly (and in particular the type of crystal 3 or equivalent) is configured to generate cooling of the crystal 3 via an "anti-Stokes" effect.

The crystal 3 is placed in heat exchange (contact) with an element 4, 5 to be cooled via a thermal link 6.

As illustrated in FIGS. 2 to 6, the thermal link comprises two plates 6 having respective first ends in heat exchange (preferably direct contact) with two distinct surfaces of the crystal 3, respectively, the two plates 6 having second ends in heat exchange (preferably direct contact) with the element 4 to be cooled.

As illustrated, preferably the second ends of the two plates 6 are in heat exchange with two distinct surfaces or flanks of the element 4 to be cooled, respectively. For example, the second ends of the two plates 6 sandwich (clasp laterally) the element 4 to be cooled, i.e. the plates 6 are placed on either side of two opposite flanks of the element 4 to be cooled (cf. FIGS. 2 to 6).

In the same way, the first ends of the two plates 6 preferably sandwich the crystal 3, i.e. the plates 6 are placed on either side of two opposite flanks of the crystal 3.

The plates 6 preferably each have a "J" or doglegged shape, i.e. each plate 6 extends in a plane non-rectilinearly, the ends of the plate 6 in heat exchange with the crystal 3 and the element 4 to be cooled, respectively, being located at two ends located on either side of the dogleg or corner, respectively.

The plates 6 for example have a thickness comprised between 0.5 and 5 mm, a width comprised between 1 and 10 mm and a length comprised between 2 and 40 mm. At each end the plates 6 make contact with the crystal 3 and the element to be cooled in an area for example of size comprised between 1 mm$^2$ and 75 mm$^2$ and 1 mm$^2$ and 100 mm$^2$, respectively.

The areas of contact for the heat exchange are thus significantly increased with respect to known solutions without increasing the bulk of the device.

The two plates 6 are for example made of sapphire or any other suitable transparent material: glass, etc. By transparent what is in particular meant is: transparent at suitable wavelengths (for example in order to let pass the radiation emitted by the crystal, which is symbolized by lines or arrows in the figures).

This geometry makes it possible to limit the amount of anti-Stokes radiation emitted from the crystal toward the element 4 to be cooled.

In addition, this architecture of the thin plates 6 allows the mirrors 7 and optical baffles 8 to be easily placed around the crystal 3. The optical baffles 8 (sometimes called "optical screens") are provided to insulate the crystal and in particular to absorb radiation around the crystal 3. These baffles 8 may in particular be made of metal, copper, aluminum, etc.

Figure 3:
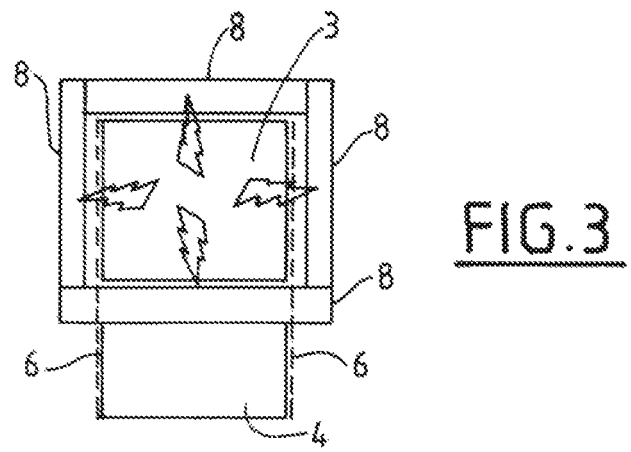
FIG. 3 shows a schematic and partial face-on view of a detail of the optical refrigerator of FIG. 2.
Figure 4:
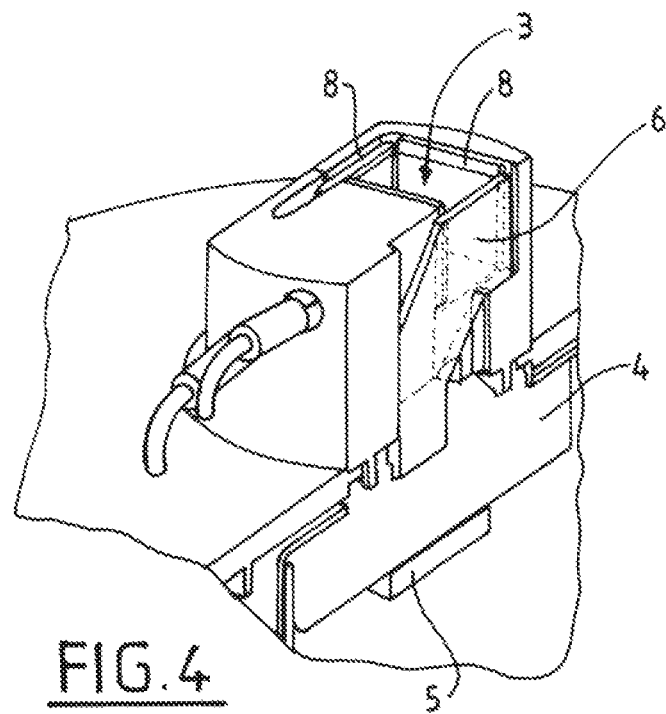
FIG. 4 shows a schematic and partial perspective view of one portion of another example of the optical refrigerator structure according to the invention, integrated into a sensor with a view to the cooling thereof.

As may be seen in FIGS. 3, 4 and 5 in particular, optical baffles 8 may be placed on either side of the first ends of the plates 6 in contact with the crystal 3. In particular, and as illustrated in the figures, the architecture of the thermal link 6 allows optical baffles 8 to be placed all the way around the crystal 3. Thus, in the case of a crystal 3 of parallelepipedal shape, a baffle 8 may be placed facing the six faces of the crystal 3.

This allows the crystal 3 to be optically isolated more completely than in the prior art and in particular under the bottom face of the crystal (i.e. the face turned toward the element 4 to be cooled). This improves the efficiency of the system.

As illustrated in FIG. 5, the laser source 2 may be configured to direct a beam through an orifice in a baffle 8.

Figure 6:
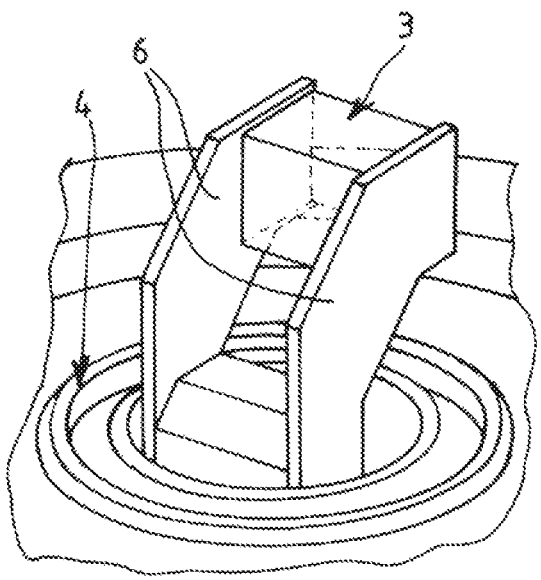

FIGS. 4 to 6 illustrate an example of a structure of an integrated assembly comprising a cooler 1 and a detector (in particular an infrared detector).

The volume of the refrigerator portion may be decreased for example to a cubic volume of less than ten cm side length.

With respect to existing solutions, apart from the decrease in size, the detection platen may be simplified.

In the example of FIG. 4, the thermal link is in exchange with a part 4 that may be a focal plane in heat exchange with a component 5 of the sensor to be cooled such as an optical sensor of a space-based apparatus (satellite, etc.).

This architecture also has a faster thermal response. Specifically, it appears to be possible to achieve a time to cool down to the target temperature (without load) of about 10 minutes approximately.

The invention may also be applied to in situ cooling of microelectronic components (for example power transistors or microcircuits) at temperatures close to ambient, and to the cooling of crystals used in the high-power (continuous-wave or pulsed) lasers.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An optical refrigerator for cooling an infrared detector or sensor, the refrigerator comprising a source of laser radiation, a cooling crystal configured to receive the laser radiation from the source and to be cooled, an element to be cooled and a thermal link in heat exchange between the crystal and the element to be cooled in order to transfer frigories from the crystal to the element to be cooled, wherein the thermal link comprises two plates having respective first ends in heat exchange with two distinct surfaces of the crystal, respectively, and respective second ends in heat exchange with the element to be cooled.

2. The refrigerator of claim 1, wherein one of the second ends is in heat exchange with one surface of the element to be cooled that is distinct from another surface of the element to be cooled that is in heat exchange with the other of the second ends.

3. The refrigerator of claim 2, wherein the second ends of the two plates sandwich the element to be cooled.

4. The refrigerator of claim 1, wherein the first ends of the two plates sandwich the crystal.

5. The refrigerator of claim 1, wherein:
the plates each have a "J" or doglegged shape that extends in a plane non-rectilinearly; and
the ends of the plate in heat exchange with the crystal and the element to be cooled, respectively, are located at two ends located on either side of a dogleg or corner, respectively.

6. The refrigerator of claim 1, wherein the plates are made of a transparent material.

7. The refrigerator of claim 6, wherein the plates are made of glass or sapphire.

8. The refrigerator of claim 1, further comprising at least two mirrors placed around the crystal in order to concentrate the light in the crystal.

9. The refrigerator of claim 1, further comprising baffles for absorbing the light radiation generated by the crystal, the baffles being placed around the crystal.

10. The refrigerator of claim 9, further comprising baffles for absorbing the light radiation generated by the crystal also around the faces of the crystal that are linked to the plates.

11. The refrigerator of claim 1, wherein the element to be cooled is a cold finger or a focal plane intended to transfer frigories to a load.

12. A detector comprising a measuring unit and refrigerator of the measuring unit, wherein the refrigerator is the refrigerator of claim 1.

* * * * *